(12) United States Patent
Trabzuni et al.

(10) Patent No.: US 7,264,672 B1
(45) Date of Patent: Sep. 4, 2007

(54) TITANIUM DIOXIDE PIGMENT COMPOSITE AND METHOD OF MAKING SAME

(75) Inventors: Fadi Mohammed Saeed Trabzuni, Jeddah (SA); Chathangat Cheroolil Gopalkrishnan, Jeddah (SA)

(73) Assignee: National Titanium Dioxide Co. Ltd. (Cristal), Jeddah (SA)

( * ) Notice: Subject to any disclaimer, the term of this patent is extended or adjusted under 35 U.S.C. 154(b) by 0 days.

(21) Appl. No.: 11/590,134

(22) Filed: Oct. 31, 2006

(51) Int. Cl.
*C09C 1/36* (2006.01)
*C09C 3/06* (2006.01)
*C09C 3/10* (2006.01)
*B05D 7/00* (2006.01)
*B32B 9/00* (2006.01)

(52) U.S. Cl. ............... 106/443; 106/436; 106/442; 427/215; 427/218; 427/219; 428/403; 428/404; 428/407

(58) Field of Classification Search ................ 106/443, 106/436, 442; 427/215, 218, 219; 428/403, 428/404, 407
See application file for complete search history.

(56) References Cited

U.S. PATENT DOCUMENTS

| | | | |
|---|---|---|---|
| 4,183,843 A | 1/1980 | Koenig et al. | |
| 4,239,548 A * | 12/1980 | Barnard et al. | 106/439 |
| 5,041,162 A | 8/1991 | Brand | |
| 5,501,732 A | 3/1996 | Niedenzu et al. | |
| 5,785,748 A * | 7/1998 | Banford et al. | 106/443 |
| 5,908,498 A | 6/1999 | Kauffman et al. | |
| 5,993,533 A | 11/1999 | Diebold et al. | |
| 6,517,629 B2 | 2/2003 | Kinniard | |
| 6,544,328 B2 | 4/2003 | Roberts et al. | |
| 6,576,052 B1 | 6/2003 | Takahashi et al. | |
| 6,743,286 B2 | 6/2004 | Wen et al. | |
| 2006/0078485 A1* | 4/2006 | Thiele et al. | 423/76 |

FOREIGN PATENT DOCUMENTS

JP 52-109531 A * 9/1977

* cited by examiner

*Primary Examiner*—Anthony J. Green
(74) *Attorney, Agent, or Firm*—Kily & Bowersox, P.L.L.C.

(57) ABSTRACT

A process for producing an improved titanium dioxide pigment composite is provided, as are particles produced thereby. The process comprises producing a slurry comprising titanium dioxide particles, leaching alumina from the surface of the titanium dioxide particles in the presence of a soluble phosphate and precipitating aluminum phosphate from the slurry onto the surface of the titanium dioxide particles thereby forming a uniform coating of aluminum phosphate on the surfaces of the titanium dioxide particles. An anionic poly-electrolyte can be added to the resulting slurry. The slurry can then be treated such that the anionic poly-electrolyte forms an additional coating on the aluminum phosphate-coated titanium dioxide particles.

17 Claims, 2 Drawing Sheets

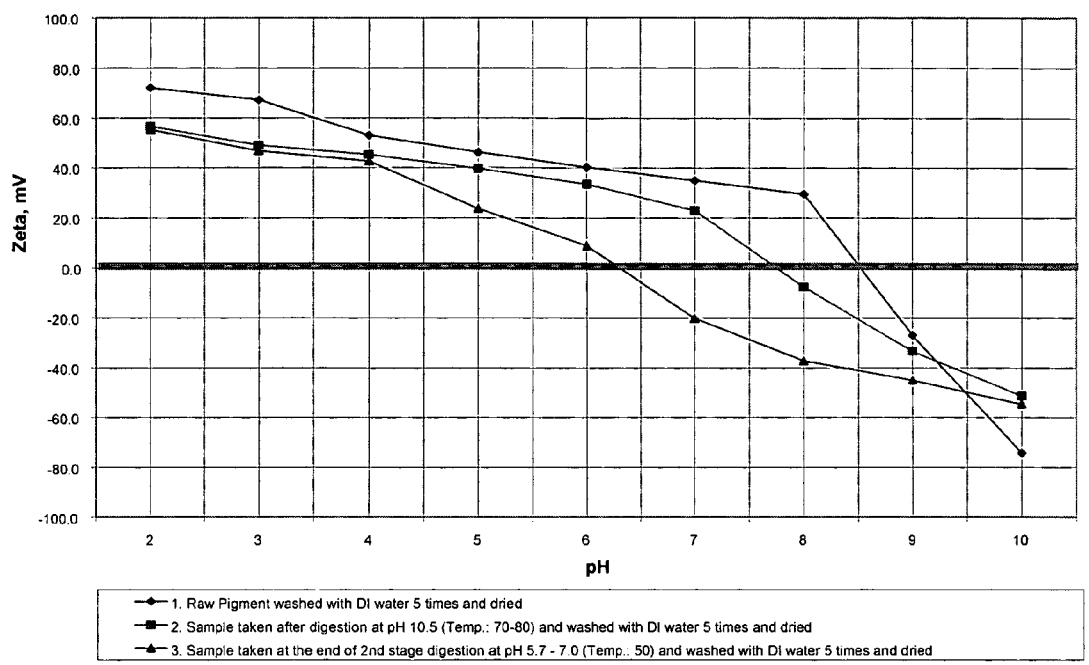

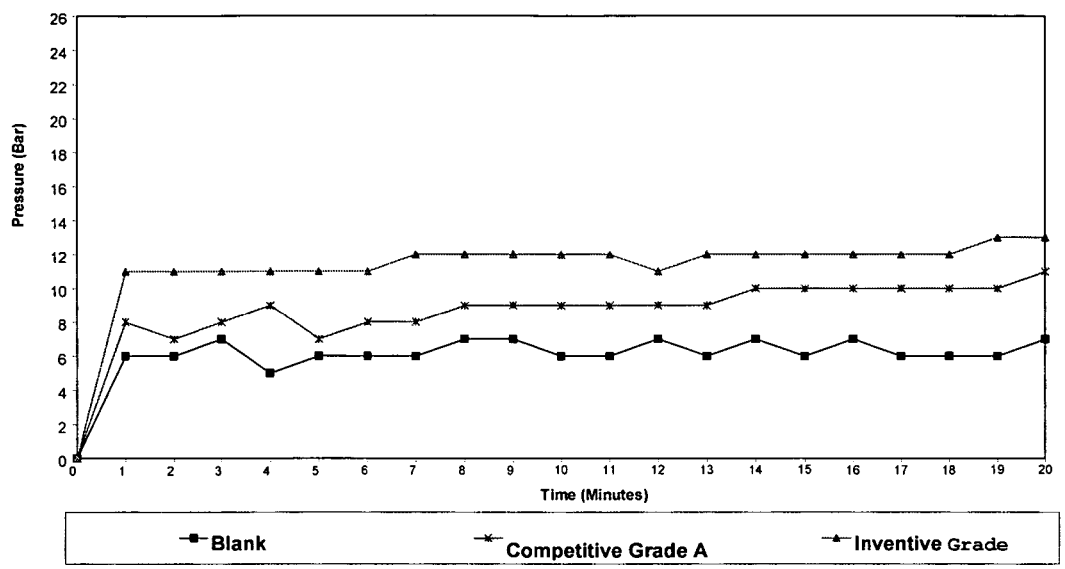

TITANIUM DIOXIDE PIGMENT COMPOSITE AND METHOD OF MAKING SAME

FIELD

This invention relates to titanium dioxide pigments and methods of making same.

BACKGROUND

The use of titanium dioxide in so many application areas such as pigment in paint and plastic compositions is a direct result of the many differing and useful properties of the pigment. A common problem with the uses of titanium dioxide is that the pigments can either promote the reaction of polymer additives with each other, or react directly with one or more of the additives. These reactions can lead to discoloration problems. In addition, titanium dioxide is photoreactive. Exposure to UV radiation can result in the generation of free radicals on the surface of titanium dioxide particles. The free radicals can migrate to the film-forming component of the composition, resulting in degradation or failure of the film. The employment of titanium dioxide in pigmented plastics, coatings, papers, and fiber compositions, therefore, can induce a photoactivity that results in oxidative degradation, which is destructive to the materials of which they are a part.

Therefore, minimizing the migration of free radicals is desirable in order to provide lightfast and stable pigments for plastic and coating applications. As a consequence, most titanium dioxide pigments are provided with some form of surface coating during manufacture to promote dispersibility and to reduce photoactivity. Widely used approaches to overcome this problem involve coating titanium dioxide particles with hydrous oxide silica, alumina, zirconia, phosphate, or mixtures thereof. These materials can be coated onto the surfaces of pigment particles in the range of 3 to 10 percent, by weight of titanium dioxide. This results in lacing. Lacing occurs as a result of volatiles being released from the pigment during high temperature poly-olefin fabrication processes. Lacing may also be attributable to titanium dioxide concentrates picking up moisture. A further disadvantage is that higher loadings of titanium dioxide pigment in a polymer concentrate result in slower processing rates.

Since titanium dioxide is photoactive, and can promote degradation of resin systems, hydrous oxide coatings are applied to titanium dioxide particles to improve durability, as mentioned above. Typically, hydrous oxide coatings on titanium dioxide particles are prepared by wet chemical methods. These involve precipitation of the hydrous oxides, such as silica, alumina, and zirconia, from solution. While these processes do provide somewhat durable coatings on the titanium dioxide particles, they often result in uneven, non-uniform, and porous coatings.

The surface treatment and coating of titanium dioxide are done to achieve improved performance characteristics in plastic compositions. Dispersibility, processability, and good optical properties are typically achieved through surface treatment of the pigment, whereas durability, low chemical reactivity, and low photochemical reactivity are typically obtained by coating the pigment with silica, alumina, and other metal oxide coatings. When precipitated using prior art practices, these metal oxide coatings tend to make the pigments more difficult to disperse in plastics. Also, pigments coated with metal oxides tend to have more adsorbed water which may cause out-gassing and lacing problems in production of plastics with coated pigments. Typically, these problems have not been solved with a single pigment. Thus, plastic compounders have generally had to choose between durability, which can be achieved with coated pigments, and dispersibility, processibility, and good optical properties which can be achieved with uncoated but treated or untreated pigments.

Titanium dioxide pigments and other pigments normally produced and used in the paint, plastics, or paper industry, are generally in the form of a finely divided powder. The powders are usually jet-milled or micronized, as a final step in their production. Jet-milling contributes dispersibility and gloss, but is also an energy-intensive and expensive step.

Jet-milled powders are inherently dusty and exhibit poor flow characteristics. Although free-flowing powders with low dusting can be obtained by spray drying, these powders generally exhibit poor pigmentary properties. Thus, pigment end users have generally had to choose between free-flowing, low dusting, spray dried pigments having poor pigmentary properties, and dusty, jet-milled pigments having poor flow characteristics.

Inorganic pigments, such as titanium dioxide, for example, are used in a variety of thermoplastic resin-based consumer goods. It is known, however, that the quality of the properties that the inorganic pigment imparts to the resin, such as opacity, color, brightness, UV stabilization, thermal stabilization, and the like, depend significantly on how evenly and uniformly the pigment is dispersed in the resin, as well as on the amount of pigment that can be effectively incorporated into the resin. It is also known that the hydrophobic nature of such thermoplastic resins is incompatible with the hydrophilic nature of such inorganic pigments, thus making it difficult to obtain good dispersion of the pigments in the resins. This is especially true at high pigment concentrations greater than 50 percent by weight, as pointed out in U.S. Pat. No. 4,183,843.

In the manufacture of titanium dioxide, it is difficult to produce a product that is low dusting, free-flowing, dense, and easily dispersed in paints and plastic melts.

Various types of coatings with hydrous metal oxides have been applied to titanium dioxide pigments to enhance the weathering character of the pigments and various processes have been developed for applying such coatings. In general, many previous processes involve the addition of a water-soluble hydrolysable metal salt to an aqueous slurry of titanium dioxide, and the addition of a pH adjusting agent to neutralize the slurry, and to form insoluble hydrous metal oxides on the pigment. This need not ensure a homogenous and uniform coating on the surface due to non-uniform and improper dispersion of the additive in the body of the aqueous titanium dioxide slurry.

Various problems have been encountered in processing titanium dioxide pigments having a high titanium dioxide content, which are used in plastics and which have been coated via prior processes. More particularly, various problems have been encountered in the filtration of such coated, plastic grade pigments, and in micronizing or milling such coated, plastic grade pigments. For example, the pigment is sticky and tends to stick to the filtration and milling apparatus. The sticking of the pigment to the various apparatus makes it extremely difficult to load the pigment into the milling apparatus and to remove the pigment after the milling operation. The finished pigment also often contains unacceptable levels of grit.

Polymeric compounds that are used to make plastics articles are processed at high temperatures for a number of industrial processes. At elevated temperatures, inorganic compounds such as titania pigments that have been incorporated in the polymeric compounds, can release volatile species such as water molecules, which can cause defects in polymers such as bubbles or holes. Holes formed in thin films may be referred to as "lacing," which is a phenomenon that limits the operating conditions of the film manufacturer. Consequently, film manufacturers often desire titanium dioxide pigment that have or reduced tendency to cause lacing.

In response to the demands of customers for grades of titania that can be processed in polymers at increasing temperatures and pigment loadings, manufacturers have been reducing the amount of inorganic surface treatment. The reason is that the inorganic species are usually hydrated, either as part of the chemical structure or water adsorbed from the atmosphere onto the surface of the pigment. Upon heating, this water is driven off and is one of the key contributors to volatiles and subsequent defects such as lacing. Reducing the inorganic surface treatment reduces the total moisture content and reduces the volume of volatile species driven off of the pigment at elevated temperature. However, providing the titanium dioxide particles with a homogeneous, uniform, thin layer surface coating is difficult and results in uncoated patches on the surface of titanium dioxide particles.

Titanium dioxide is the premier white pigment used for whitening, brightening, and opacifying plastics, paper, and paints. As normally produced, titanium dioxide is a hydrophilic pigment, meaning that it is readily wet by water and not wet by hydrophobic materials like organic polymers. In order to permit titanium dioxide pigment to be wet-out by and dispersed in organic polymers, the surface of the pigment must be modified or made hydrophobic, so that the polymer will spread over the pigment's surface and good adhesion between the pigment and polymer will occur. Hydrophobic titanium dioxide pigments are prepared by treatment with "non-reactive" organic substances or "reactive" organic compounds.

It can be seen from the above discussion that the customers who process titanium dioxide pigments in polymers demand titanium dioxide pigments meeting the following characteristics:

1. Good optical properties;
2. Good durability;
3. Resistant to chemical and photochemical reactions;
4. Anti-yellowing;
5. Low-volatility;
6. Low dusting; and
7. Good Processibility There is a continuing need for a process for preparing improved pigments which meet all of the above requirements.

SUMMARY

The present teachings provide a process for preparing improved composite particle compositions which meet the needs described above, and overcome the deficiencies of the art described above. The present teachings provide processes for making pigment compositions that are free of the deficiencies described above.

According to various embodiments, the general objects of the present teachings are to provide certain novel processes for the preparation of new and improved compositions of titanium dioxide, and also to provide such compositions themselves, which are useful as pigments for plastics applications. In some embodiments, the present teachings relate to pigmentary titanium dioxide particles having coated on the surfaces thereof a uniform thin layer of aluminum phosphate and a specific type of organic reagent that can consist of an anionic polyelectrolyte surfactant. In some embodiments, the present teachings relate to an improved titanium dioxide pigment by a novel method of coating sand-milled titanium dioxide pigments with a thin uniform layer of aluminum phosphate. The aluminum component of the aluminum phosphate can be generated in situ by leaching process from titanium dioxide particles themselves. The particles can be further treated with a polyelectrolyte surfactant contiguous with the phosphate deposit before filtering and drying, to eliminate the need for fluid energy micronization or jet-milling while maintaining good processibility and dispersibility in polyolefin resins, resulting in a more economical, less energy-intensive process. The titanium dioxide pigments of the present teachings can be substantially hydrophobic, non-reactive, and not affected by water. The pigments also can have a significantly decreased photoreactivity which makes them more resistant to degradation and more chemically inert than non-coated pigments. The pigments also exhibit good optical properties and also exhibit low-volatility and low-dusting.

It is an object of the present teachings to describe a process for producing a titanium dioxide pigment possessing improved optical, durability, and processing properties, for use in, for example, plastic applications.

It is an object of the present teachings to describe a process for producing a durable titanium dioxide pigment comprising a deposited, homogeneous, uniform, thin-layer of aluminium phosphate. The aluminium portion of the aluminium phosphate can be generated in-situ, by a leaching process.

It is an object of the present teachings to describe a novel process for producing titanium dioxide pigments having substantially hydrophobic or oleophilic properties.

It is another object of the present teachings to describe a process for producing a titanium dioxide pigment composite having a high bulk density.

It is another object of the present teachings to describe a process for producing a pigmentary titanium dioxide composite that has a low-volatility.

It is another object of the present teachings to describe a process for producing a titanium dioxide composite that is low-dusting.

It is another object of the present teachings to describe a process for producing a composite that is lacing resistant.

It is another object of the present teachings to describe a process for producing a composite that is easily processed.

Further objects of the present teachings will be apparent from the ensuing description, which should be considered exemplary and not limiting.

In accordance with the present teachings, a high solids aqueous titanium dioxide slurry can be prepared by dispersing the base pigmentary titanium dioxide in an aqueous slurry, for example, at a solids level of from about 200 to about 700 grams titanium dioxide per liter of water, or at a solids level of from about 300 to about 600 grams per liter of water, or at a solids level of from about 400 to about 600 grams per liter of water. The viscosity of the slurry is reduced to a minimum of about 25 cps or less by adjusting the pH within the range of from about 7 to about 11 by adding caustic, or the like, and treating with a reducing agent and/or dispersion promoter from the family of water-soluble phosphate compounds, such as, for example, tetrapotassium pyrophosphate, sodium polyphosphate, tetrasodium pyrophosphate (Tetron), sodium tripolyphosphate, potassium tripolyphosphate, sodium hexametaphosphate (Calgon), phosphoric acid, and the like. Most preferably, the water soluble phosphate compound is sodium hexametaphosphate. The phosphate content as calgon is added to the slurry in an amount of preferably from about 0.05% by weight to about 0.5% by weight, more preferably from about 0.1% by weight to about 0.3% by weight, for example, from about 0.12% by weight to about 0.20% by weight, based on the total weight of titanium dioxide pigment. The slurry is then media milled to reduce the titanium dioxide particle size, followed by screening and classification.

In some embodiments, the slurry can next be subject to a leaching process to dissolve at least some of the co-oxidized alumina segregated to the surface of titanium dioxide particles to form a homogeneously dispersed aluminum compound in the bulk of the aqueous titanium dioxide slurry. The leaching can be done under agitation and at an elevated temperature. Dissolved aluminum can become the source of alumina and the source of phosphate can comprise the Calgon added in the beginning as a reducing agent, for aluminium phosphate to be deposited. The dissolved alumina and the phosphate co-exist in the medium in a homogeneously dispersed condition after the leaching process and allow an effective thin and uniform coating to be formed in a subsequent aluminum phosphate deposition process, on the titanium dioxide pigment particles.

Following leaching process, the slurry pH can be adjusted to a desired value, for example, to a value of from about 3.5 to about 6.5, for example, from about 5 to about 6.5. The pH can be adjusted by using, for example, sulphuric acid or hydrochloric acid. The slurry can be allowed to age under agitation, for a period of time, for example, for not less than 5 minutes, to form a homogeneous, uniform, thin aluminum phosphate deposit on the surface of the titanium dioxide particles.

Following phosphate coating, the pH of the slurry can be adjusted to be about 3 or slightly higher, for example, from about 3.0 to about 3.5, and the slurry can be treated with an anionic polyelectrolyte reagent. The organic coating can be performed in two stages wherein, in the first stage, about half of the quantity of the total requirement can be added, and wherein, in the second stage, the remaining quantity can be added. During organic treatment, the pH can tend to drift upward as the organic coating material is added. The pH can be maintained at the desired value by adding acid at the end of each step. After aging, the slurry pH can be adjusted to be between about 4.5 and about 5.0. The titanium dioxide slurry can then be in a semi-finished stage. The slurry can then finally be pressure filtered, washed, dried, and packaged as a product, without micronization, for use in plastics.

The present teachings also provide a titanium dioxide pigment prepared by a process as described herein, wherein the titanium dioxide pigment can include a uniform coating comprising a thin layer of aluminum phosphate, for example, having a treatment layer thickness of from about 0.5 nm to about 1.0 nm as compared to a conventional coating thickness of from about 5 nm to about 6 nm. The coating can be made using only a small quantity of the coating material. The resulting pigment can exhibit a durability equivalent to more conventionally treated pigments while obviating the problems associated with such coatings, such as lacing in plastic applications, and retaining high optical properties associated with high titanium dioxide content in pigment. The pigment also exhibits low-volatility because of the thin and effective coating. The very high titanium dioxide content of the pigment of the present teachings offers exceptional opacity and therefore, economical polymer coloration.

The product so produced surprisingly is substantially hydrophobic and develops desirable performance characteristics making the titanium dioxide composite useful in many applications, including pigmenting plastics. The pigment exhibits low-dusting and exhibits high untapped bulk density. These qualities improve processing performance.

Thus, it is a general object of the present teachings to provide improved, durable, titanium dioxide compositions, and methods of producing the same.

It is to be understood that both the foregoing general description and the following detailed description are exemplary and explanatory only and are intended to provide a further explanation of the present teachings, as claimed.

BRIEF DESCRIPTION OF THE DRAWING

Various embodiments of the present teachings are exemplified in the accompanying drawing. The teachings are not limited to the embodiments depicted in the drawing, and include equivalent structures and methods as set forth in the following description and as would be known to those of ordinary skill in the art in view of the present teachings. In the drawings:

FIG. 1 is a chart depicting electrokinetic measurements of titanium dioxide particles at various stages of processing according to the present teachings; and FIG. 2 is a chart showing comparative performance of the inventive grade during compounding process in 70% Master Batch.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

DETAILED DESCRIPTION OF THE PRESENT INVENTION

According to various embodiments, the present teachings relate to titanium dioxide particles, and a process for making the same. The process can involve coating the particles with one or more layers to improve the dispersability of the particles. The particles can be used as a pigment in a variety of applications, including the production of plastics. The starting materials for use in the process include titanium dioxides that can have either a rutile, crystalline structure, an anatase crystalline structure, or a combination thereof. In some embodiments, titanium dioxide starting material can be produced, for example, by either the chloride process, or the sulphate process. In the chloride process, aluminum chloride ($AlCl_3$) is typically mixed with $TiCl_4$ prior to oxidization of the $TiCl_4$. Part of the $AlCl_3$ becomes incorporated on the surfaces of the titanium dioxide particles as aluminum oxide ($Al_2O_3$). The amount of $AlCl_3$ added is sufficient to provide from about 0.5% by weight to about 1.5% by weight $Al_2O_3$, based on the weight of the $TiO_2$. This gaseous-suspension is then rapidly cooled to provide the base titanium dioxide pigment particles. In the alternative sulfate process, titanium ore is dissolved into sulfuric acid which is then filtered to remove any insoluble metal sulfates. The resulting mixture of aqueous titanyl sulfate and ferrous sulfate is cooled and the ferrous sulfate precipitates out. The titanyl sulfate is hydrolyzed to titanium hydroxide which is subsequently calcined to produce base titanium dioxide pigment particles.

In some embodiments, the starting material for the process of the present teachings can be a base titanium dioxide raw pigment from an oxidizer discharge. The titanium dioxide can be well dispersed in an aqueous mixture or slurry. The slurry can comprise a dispersing agent, also referred to herein as a dispersion promoter. In some embodiments, the dispersion promoter can comprise Calgon or another phosphate. The slurry can be an alkaline slurry. The slurry can have a pH, for example, in the range of from about 7 to about 11.

Milling can be performed to achieve a highly dispersed slurry. For example, a media mill, such as a sand mill or horizontal media mill, can be used. The milling can cause the break-down of oversized aggregates, and/or the dispersion of the titanium dioxide. According to various embodiments, a slurry can be generated in a wet mill having a low level of coarse particles. Milling can negate the need for a micronization step. Operating at a higher solid content can allow for increased residence time for a given throughput, and can thus be beneficial for achieving a high degree of milling. The milled slurry can be screened and classified. The screening and classifying can be conducted in multiple hydroseparations.

According to various embodiments, the present teachings encompass the in-situ generation of aluminate in a slurry. This can be achieved, in part, by leaching soluble alumina from the slurry. The leached soluble alumina can comprise alumina segregated to the surface of the titanium dioxide particles as opposed to comprising the entirety of alumina added as burner alumina, during $TiCl_4$ oxidation. The leaching can be conducted under either acidic or alkaline conditions. For example, leaching can be done at a pH in a range of from about 7.0 to a pH of about 12.0, or in a range of from a pH of about 9.5 to a pH of about 11.5, or in a range of from a pH of about 10 to a pH of about 11. Leaching can comprise adjusting the temperature of the slurry to be from about 50° C. to about 90° C., for example, from about 70° C. to about 80° C. Leaching can be done for a period of time of, for example, from about 10 minutes to about 60 minutes or from about 15 minutes to about 20 minutes.

The leaching can be conducted using a solvent. The solvent can be an acid such as hydrochloric acid, sulfuric acid, or nitric acid. The solvent can be a base such as sodium hydroxide or potassium hydroxide. Sodium hydroxide can be used if the slurry is already dispersed in alkaline medium using, for example, sodium hydroxide. The leached soluble alumina can be homogenously dispersed in the slurry. The leached soluble alumina can be dissolved in the slurry. The alumina dissolved by the leaching process from the surface of the titanium dioxide pigment particles can be homogenously dispersed in the slurry.

According to various embodiments, the leaching of the titanium dioxide particles can cause the dissolution of segregated co-oxidized alumina from the surface of the titanium dioxide particles. A phosphate compound can be added to the slurry as a dispersant. The phosphate compound can be homogenously dispersed in the slurry. The homogeneously dispersed phosphate compound can allow for the uniform deposition of aluminum phosphate onto the surface of each titanium dioxide particle in the slurry. A low concentration of aluminate and/or phosphate in the slurry can decrease the risk of a bulk precipitation.

According to various embodiments, the present teachings encompass a process of coating of titanium dioxide particles with a thin and uniform layer of aluminum phosphate. The coating can be achieved by slowly adjusting the pH of the slurry. The pH of the slurry can be adjusted to a target pH for aluminum phosphate deposition. Agitation can ensure rapid mixing of the acid/base used to neutralize the slurry. Mixing can prevent the formation of zones of high acid/base concentration and uncontrolled aluminum phosphate precipitation in the slurry. A slurry having a low viscosity can be highly beneficial to the process of the present teachings. The process of coating the titanium dioxide particles with aluminum phosphate can yield a coating of from about 0.1% by weight to about 0.3% by weight, based on the total weight of the coated titanium dioxide particles.

The resulting coated titanium dioxide particles can be subsequently treated with a surface treatment agent. The surface treatment agent can contain both hydrophilic and hydrophobic groups. The hydrophilic groups can comprise, but are not limited to, carboxyl, phosphate, sulphate, alcohol, amine groups, and combinations thereof. The hydrophobic groups can comprise, but are not limited to, aliphatic groups, silane groups, siloxane groups, and combinations thereof.

The surface treatment agent can prevent the titanium dioxide particles from cementing together during filtration and/or drying. The surface treatment agent can also promote flocculation in the liquid phase during processing. Sufficient flocculation can allow for the efficient filtering and washing of the particles. The surface treatment agent can function as a binding agent in dried particles. The surface treatment agent can reduce dusting and/or allow for the particles to be free flowing.

According to various embodiments, the surface treatment agent can render the titanium dioxide particles hydrophobic. According to various embodiments, the surface treatment agents can comprise inorganic and/or organic coating materials. The surface treatment agents can be substantially-homogenously deposited on the titanium dioxide particles.

According to various embodiments, the method of the present teachings can comprise generating a compound to be deposited on the surface of the titanium dioxide particles, in an aqueous medium. The process can include the step of forming a homogenously dispersed solution of the compound to be deposited. The process can comprise the precipitation of the coating material from the homogenous solution by the gradual and controlled change in the pH of the slurry, so as to cause formation of an insoluble compound of a metal, with nucleation, and the deposition thereof occurring substantially exclusively on the surface of the titanium dioxide particles, in the form of a uniformly thin layer. By means of such process, homogenous deposition of the coating material can be achieved.

According to various embodiments, the slurry can comprise a homogenous distribution of small particles of titanium dioxide. The titanium dioxide particles can each comprise a substantially continuous, very thin, layer of the metal compound, on the surface thereof.

The metal to be deposited can be generated from the titanium dioxide particles dispersed in the slurry. The metal can be a dissolved species and can also be distributed homogenously throughout the slurry. This uniformity of the dissolved species can enable the uniform nucleation of the depositing material. The uniformity can result in the homogenous deposition of the material on the titanium dioxide particles. The zeta potential changes occurring on the surface of titanium dioxide particles coated during the processing stages are summarized in FIG. 1.

According to various embodiments, the deposition of the metal compound can be caused by gradually and homogenously changing the pH of the slurry, in a controlled fashion. The change in the pH of the slurry can be affected in various ways. The pH of the aqueous medium can be gradually changed to a level at which the nucleation of an insoluble metal hydroxide, oxide, or salt on the surface of the supporting particles, takes place. According to various embodiments, the aluminum phosphate titanium dioxide particles can be stabilized into a high energy disperse phase. The aluminum phosphate titanium dioxide particles can be treated with a treating agent comprising an oligomeric polyacid dispersant. The oligomeric polyacid dispersant can comprise an organic surfactant. The organic surfactant can comprise, for example, acrylic acid oligomers, methacrylic acid oligomers, α-olefin-maleic acid co-oligomers, or a combination thereof. The organic surfactant can be a maleic acid co-oligomer. Maleic acid co-oligomers are significantly adsorbed onto the aluminum phosphate-coated titanium dioxide particles. The adsorption of the dispersant can increase the stability of the dispersion by increasing the electro-steric repulsion between coated titanium dioxide particles. It has been observed that the adsorption of α-olefin-maleic acid co-oligomers onto the surface of titanium dioxide particles depends on the surface treatment of titanium dioxide particles, and the chemical composition of the α-olefin-maleic acid co-oligomer. In some embodiments, the surfactant coating comprises an alpha-olefin/maleic acid co-oligomer, for example, of the formula:

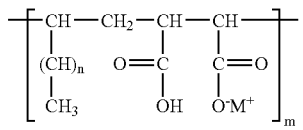

wherein:
n=6 to 9
m=40-45
M=a metallic monovalent cation.

In some embodiments, high-molecular weight compounds can be effective as treating agents for producing hydrophobic titanium dioxide particles. Particles processed with high-molecular weight compounds can desirably cause some degree of aggregation. If the amount of treating agent used is too small, the intended surface modification cannot be satisfactorily attained. On the other hand, if the amount is too large, many aggregates can be formed. The polymer can be diluted sufficiently, to generate more poly-ions, which can result in better coating.

According to various embodiments, an α-olefin-maleic acid co-oligomer, with a molecular weight of about 12,000 g/mol, can be chosen for the treatment of the titanium dioxide particles. An anionic poly-electrolyte and a sodium salt form thereof, can be used, for example. A particle with only carboxylate surface groups will normally have a point of zero charge at a pH of about 2.0. At high concentrations of the treating agent, the point of zero charge can approach a pH of about 2.0. Adsorption of the polyelectrolyte can shift the iso-electric point (IEP) to a lower level. At a treating agent concentration in the slurry of from about 0.5% to about 0.6%, the IEP pH can be from about 3.0 to about 3.5. The shifting of the IEP to lower pH range can help to eliminate the interaction and incorporation of silica particles onto the titanium dioxide particles. In view of the fact that the IEP of silica particles is from about 2 to about 3, silica grits can be prevented from being carried along with the titanium dioxide particles, by electrostatic attraction.

According to some embodiments, the treating agent can form a physical barrier, keeping the interacting particles apart. The van der Waals attractive force between the interacting particles can be lessened. When the particle coverage by the treating agent is at or near mono-layer levels, the important attractive force between the particles in the dispersion can comprise intra-segmental, hydrophobic attractions.

Intra-segmental, hydrophobic attractions can squeeze water molecules from the spaces between interacting particles. This can enhance the entropy of the system. The overall effect can be a low dusting, low water content, and dispersion stabilized, titanium dioxide particle composition suitable for incorporation into plastics.

According to some embodiments, the adsorption of the treating agent is generally very near to, or below, the point of zero charge. At the point of zero charge, the adsorption is usually close to about 100%.

In some embodiments, the treatment agent can comprise a commercially-available, anionic, poly-electrolyte surfactant derivative. The treating agent can comprise an α-olefin maleic acid co-oligomer sold by BASF Corporation, Florham Park, N.J., under the trade designation SOKOLAN CP-9.

The treating agent can render the surfaces of the titanium dioxide particles hydrophobic. The present teachings provide a method of imparting hydrophobic properties to finely divided titanium dioxide particles that can have certain advantages over previous methods. Such advantages can include: (1) a thicker coating of treating agent can be applied; (2) the particles can be rendered hydrophobic in a single step, thereby eliminating subsequent treatment steps described in the related art; and (3) the hydrophobic titanium dioxide particles can be prepared by a wet method and processed in an aqueous system for hydrophobization.

The highly loaded pigmentary titanium dioxide particles described herein can exhibit good processability in a polymeric matrix. The titanium dioxide particles of the present teachings can exhibit lacing resistance when cooled within a poly-olefin matrix. Additional advantages observed can include increased bulk density, good dispersibility, moisture resistance, and/or excellent optical properties, for example, a high tint strength.

According to various embodiments, the bulk density of the titanium dioxide compositions of the present teachings can also be increased. Bulk density is measured herein as grams per cubic centimeter (g/cm$^3$) of uncompacted titanium dioxide particle. A particle bulk density below about 0.6 g/cm$^3$ can result in difficult solids handling and/or polymer compounding. For rapid compounding of titanium dioxide and a polymer in a Banbury type mixer, a bulk density above about 0.6 g/cm$^3$ can be desirable.

When aluminum is present in a range of from about 0.5% by weight to about 2% by weight calculated as $Al_2O_3$ and based on the weight of the titanium dioxide, the titanium dioxide pigment can exhibit high yellowing and baking discoloration resistance properties, rendering it particularly adaptable for use in high temperature applications.

In some embodiments, the particles can be measured with a Microtrac™ analyzer, available from Microtrac, North Largo, Fla. A particle size measuring greater than a 0.6 micron fraction, can be a measurement of the agglomeration, and of the potential for gloss in a finished product. A value in the range of 90% of the particles having a size of <0.6 microns is provided according to some embodiments of the present teachings.

A typical overall process of preparing the improved titanium dioxide pigment of the present teachings can comprise the following exemplary steps:

1. Preparing a finely divided, stable, high-solids titanium dioxide suspension in an aqueous medium having a low viscosity. The sedimentation rate of the titanium dioxide suspension can be sufficiently low to permit the homogeneous distribution thereof, in the medium, under agitated conditions, during the process. The solids content can typically be from about 300 to about 600 grams of solids, per liter of water. The titanium dioxide solids content of the slurry can be from about 400 to about 600 grams per liter of water. The raw titanium dioxide pigment used for making the slurry can contain co-oxidized alumina, expressed as a percentage by weight of $Al_2O_3$ on the titanium dioxide. A reducing agent (herein also referred to as a reducent or dispersion promoter) from the family of water-soluble phosphate compounds, can be used, such as, for example, tetrapotassium pyrophosphate, sodium polyphosphate, tetrasodium pyrophosphate (Tetron), sodium tripolyphosphate, potassium tripolyphosphate, sodium hexametaphosphate (Calgon), phosphoric acid, and the like. The pH range can be from about 7 to about 11. The viscosity of the slurry can be maintained at low values, for example, at from about 5 to about 50 centipoise;
2. Milling the dispersed aqueous slurry having low viscosity until about 90% of the particles are less than about 0.63 microns in diameter, as measured by a Microtrac™ particle size analyzer;
3. Removing the milling media from the aqueous slurry;
4. Dissolving a part of segregated co-oxidized alumina from the titanium dioxide particles at a pH, and sufficiently high to precipitate the previously added dispersant, and to react, to thereby precipitate as aluminum phosphate. The slurry pH can be adjusted to a range of from about 9 to about 11 or to about 10.5±0.1, by adding caustic and digesting the slurry. The slurry can be digested at a temperature of from about 50° C. to about 90° C. for a time period of from about 10 minutes to about 30 minutes. The process can dissolve from about 20% by weight to about 45% by weight of the segregated, co-oxidized alumina from the surface of the titanium dioxide particles, to form alumina dissolved in the slurry, which alumina that can be homogenously dispersed;
5. Adding sulfuric acid slowly to the slurry to adjust the slurry pH to a level in the range of from about 5.0 to about 6.5, and digesting. The digesting can be followed by a second addition of sulfuric acid to reduce the pH to a level within the range of from about 3.0 to about 3.5. Further digesting of the slurry can be conducted to form homogenous, uniform, and thin-coatings of predominantly aluminum phosphate on the titanium dioxide particles;
6. Adding a first amount of polymeric surfactant to the slurry at a rate of from about 30 to about 40 liters per minute, the amount of surfactant added being in the range of from about 0.25% by weight to about 0.30% by weight, based on the weight of the coated $TiO_2$ pigment, and digesting the slurry followed by adjusting the pH again to be within a range of from about 3.0 to about 3.5 by addition of sulfuric acid to maintain the pH in the range;
7. Adding a second amount of polymeric surfactant to the slurry and digesting the slurry to form a second coating of polymeric surfactant in the range of from about 0.25% by weight to about 0.30% by weight, based on the weight of the coated $TiO_2$ pigment, such that the total amount of polymer will be from about 0.25% by weight to about 0.6% by weight, based on the weight of the coated $TiO_2$ pigment; and
8. Adjusting the pH of the slurry to a level within the range of from about 4.0 to about 4.5 and further digesting the slurry; and
9. Recovering the final slurry by filtration, and drying to less than 0.5% by weight moisture. The pigment can be packed as a product without micronization for use in plastics compositions.

In some embodiments, the starting pigment material that can be used in the first step described above can contain from about 0.5% by weight to about 2.0% by weight co-oxidized burner alumina, based upon the weight of the titanium dioxide. Preferably, the titanium dioxide in step (1) can comprise from about 1.0% by weight to about 1.5% by weight alumina, based on the weight of the titanium dioxide. For example, the pigment material in step (1) can comprise from about 1.20% by weight to about 1.30% by weight alumina, based on the weight of the pigment material. In some embodiments, the particles used in step (1) can exhibit a carbon black undertone (CBU) of from about −6.0 to about −8.0.

In some embodiments, the alumina removed from the surface of the particles can comprise 10% to about 45% by weight, of the total alumina disposed upon the titanium dioxide particles, for example, from about 20% to about 25% of the total weight of alumina disposed on the starting particles.

In some embodiments, the reducing agent (dispersion promoter) material used in the first step described herein can comprise a phosphate material. In some embodiments, the dispersion promoter in the first step can comprise sodium hexametaphosphate. The dispersion promoter can be present in an amount in the range of from about 0.05% by weight to about 0.5% by weight, based upon the weight of the titanium dioxide starting particles. Preferably, the amount of the dispersion promoter can be from about 0.13% by weight to about 0.2% by weight, based upon the weight of the titanium dioxide.

According to some embodiments, the pH range in step (I) can be from about 7 to about 11. Preferably, the pH range can be in the range of from about 9.5 to about 10.5.

According to various embodiments, the viscosity of the slurry in step (1) can be less than 25 centipoise (cps). Preferably, the viscosity of the slurry in step (1) can be in the range of from about 5 to about 15 cps.

According to some embodiments, the milling media used in step (2) can comprise zirconia sand. According to various embodiments, milling can occur until from about 85% to about 90% of said titanium dioxide particles can be 0.63 microns or less in diameter, as measured by a Microtrac™ X100.

According to some embodiments, the temperature during steps 4 through 8 can be maintained within the range of from about 50° C. to about 90° C. Preferably the temperature is maintained in the range from about 70° C. to 80° C.

Precipitating can comprise adjusting the temperature of the slurry to be from about 50° C. to about 90° C., for example, from about 70° C. to about 80° C. Precipitating can be done for a period of time of, for example, from about 10 minutes to about 60 minutes or from about 15 minutes to about 20 minutes.

The alumina used for coating can be derived in-situ by digesting the slurry to form a homogenously dispersed alumina material in the titanium dioxide slurry. The amount of alumina dissolved in step (4) can be from about 20% by weight to about 45% by weight of the original burner co-oxidized alumina present in the titanium dioxide material. Preferably, the dissolved alumina can be in the range of from about 20% to about 25% by weight of the original burner co-oxidized alumina present in the titanium dioxide material. The alumina dissolved during leaching can be sufficient to precipitate the phosphate added as a reducing agent during step (1) and thereby forming aluminum phosphate.

According to some embodiments, the pH of said slurry during step (4) can be from about 9 to about 11. Preferably, the pH can be maintained at 10.5±0.1. The pH of the slurry in step (5) is preferably adjusted to a level within the range of from about 5.0 to about 6.5. The pH of the slurry can be initially adjusted in step (5) to be in the range of from about 3.0 to about 3.5. After digestion, the pH of the slurry in step (6), before adding the organic dispersant, can be adjusted, if necessary, to be in the range of from about 3.0 to about 3.5. The pH can be adjusted to this range after adding the first stage dispersion promoter. The pH of the slurry in step (8) can be adjusted, if needed, to be in the range of from about 4.0 to about 4.5. In some embodiments, precipitation can comprise two stages of digestion, and each stage can last for from about 3.0 minutes to about 7.0 minutes.

According to some embodiments, the pH adjusting agent in step (1) can comprise any suitable alkaline compound. For example, the pH adjusting agent can comprise sodium hydroxide, potassium hydroxide, ammonium hydroxide, or combinations thereof. The pH adjusting agent in steps (5) to (8) can comprise a mineral acid, for example, sulfuric acid, hydrochloric acid, or nitric acid.

In some embodiments, the slurry can be digested in step (4) for a time period of from about 15 to about 20 minutes. In some embodiments, the slurry can be digested for about 5 minutes whenever the digestion is initiated in steps (5) to (8).

According to various embodiments, the amount of aluminum phosphate deposited in steps (4) and (5) can be in the range of from about 0.25% to about 0.35% by weight, based on the weight of the aluminum phosphate-coated titanium dioxide particles.

According to some embodiments, the titanium dioxide can be coated with a total amount of treating agent suitable for encapsulating the titanium dioxide surface. The total amount of treating agent can be from about 0.2% by weight to about 1.0% by weight, based on the weight of the aluminum phosphate-coated titanium dioxide particles. In some embodiments, the titanium dioxide particles are coated with from about 0.25% by weight to about 0.6% by weight treating agent, based on the weight of the aluminum phosphate-coated titanium dioxide particles. The treating agent can be added in two or more stages. For example, about half of the treating agent can be added in step (6), and the remaining half can be added in step (7). The treating agent can be diluted with water to obtain a weight ratio in water in the range of from about 1:1 to about 1:6 treating agent to water. The treating agent can, in some embodiments, be diluted to obtain a weight ratio of about 1:4 measured as treating agent to water. The processed particles can be recovered by filtering in Larox pressure filters, and can be dried in a spin flash drier.

According to some embodiments, a first treating agent can be used that comprises a polymeric surfactant. A first amount of the polymeric surfactant can be added to the slurry at a rate of from about 30 liters per minute to about 40 liters per minute. The amount of surfactant added can be in the range of from about 0.25% by weight to about 0.3% by weight, based on the weight of the aluminum phosphate-coated titanium dioxide particles. The slurry can then be digested. The pH of the slurry can be adjusted to be within a range of from about 3.0 to about 3.5 by the addition of sulfuric acid. The pH can be maintained at that range.

According to various embodiments, a second amount of polymeric surfactant can be added to the slurry. The slurry can be digested to form a second coating of polymeric surfactant again in the range of from about 0.25% by weight to about 0.3% by weight, based on the weight of the coated titanium dioxide particles. The total amount of polymer can be from about 0.25% by weight to about 0.6% by weight, based on the weight of the coated titanium dioxide particles. The pH of the slurry can be adjusted to a level within the range of from about 4.0 to about 4.5, and the slurry can be further digested.

According to some embodiments, the final slurry can be recovered by filtration and drying to achieve a moisture content of about 0% by weight. The slurry can be packed as a product without micronization, and is ready for use in plastic compositions.

According to various embodiments, a process is provided that comprises preparing an aqueous body of titanium dioxide slurry with low viscosity and high solid content, milling the aqueous pigment slurry, generating the coating material in-situ in a homogenously dispersed form by a leaching process, converting this dissolved material into a thin layer of the coating material uniformly on the surface of the titanium dioxide particles, stabilizing the coated titanium dioxide particles by organic surface treatment to prevent aggregation or agglomeration during downstream operations such as filtration and drying, and Larox filtering and spin flash drying the slurry.

The plastic grade titanium dioxide pigment of the present teachings has a less tendency to stick to the milling or filtration apparatus. The process of the present teachings substantially reduces manufacturing costs and increases production rate, while producing a plastic grade titanium dioxide pigment with equal or superior overall properties as compared to plastic grade titanium dioxide pigment produced via prior processes.

Pigments prepared using the inventive process exhibit optics and dispersibility equivalent to non-coated pigments and maintain the durability of more conventionally-treated pigments.

The present teachings are further described and illustrated by the following example. This example represents one specific embodiment of the present invention and is not to be construed as limiting.

EXAMPLE 16.8 tons of titanium dioxide particles were mixed with sufficient water to provide titanium dioxide particle slurry comprising 300 grams per liter (gpL) solids. The particles were dispersed using sodium hexametaphosphate (Calgon), available from Reckett Benckiser, Slough, Berks, United Kingdom. Dispersion was accomplished by adding 0.15% by weight Calgon, based on the weight of the starting titanium dioxide particles in the slurry. The pH of the slurry was adjusted to 9.5 after addition of sodium hydroxide. The slurry viscosity was reduced to 5.5 cps. The slurry was milled in vertical sand mills. The particle size distribution of the titanium dioxide particles was such that 90% of the titanium dioxide particles were less than 0.63 microns, when analyzed in a Microtrac™ X100 particle analyzer. The sandmilled slurry was screened through a 200 mesh screen to separate out the titanium dioxide particles from the grinding media. The slurry was then classified in hydrocyclones to remove the coarser particles.

55,000 liters of the slurry were moved to a treatment tank. The slurry was heated to 70° C. The pH of the heated slurry was adjusted to a value of 10.5 by adding 59 liters of 32% by weight, sodium hydroxide in water. The slurry was digested under agitation for 15 minutes.

At the end of the digestion, the pH of the slurry was adjusted to 5.0, by adding 39 liters of 98% by weight, sulfuric acid. The slurry was held at a pH of 5.0 and a temperature of 70° C., for 5 minutes, under agitation.

The pH was further reduced to 3.5 by adding 9 liters of 98% by weight, sulfuric acid. The slurry was held at a pH of 3.5 and a temperature of 70° C. for 5 minutes, under agitation.

Following this treatment, a homogenous and thin uniform layer of aluminum phosphate was precipitated onto the surface of the titanium dioxide particles.

On completion of the above treatment, the pH of the slurry was confirmed to be 3.5. Then, 815 liters of 1:4 diluted SOLOKAN CP-9 solution, having an active content concentration of 25% by weight (undiluted), was then added at a rate of 30 liters per minute, and digested for 5 minutes. The slurry pH was checked and found to be 4.6 at the end of digestion. The pH was adjusted to pH 3.5 by adding 5 liters of 98% by weight, sulfuric acid. An additional 815 liters of SOLOKAN CP-9 solution was added at the rate of 30 liters per minute, and digested for 5 minutes. The slurry pH was determined to be 4.2. The slurry pH was adjusted to 4.4 by the addition of 6 liters of 32% by weight, caustic. The slurry was filtered and washed in a Larox pressure filter. The filter cake contained 27% moisture by weight. The filtered cake was dried in a spin flash drier and the dried powder was packed. The titanium dioxide pigment was confirmed to be substantially hydrophobic, low dusting, and to have low volatility.

The properties of the resulting titanium dioxide pigment are summarized below in Table 1. All percentages shown in Table 1 are by weight, based on the total weight of the pigment compositions.

TABLE 1

Typical Performance of Inventive Titanium Dioxide Pigment Compositions

| | TYPICAL VALUES | |
|---|---|---|
| CHARACTERISTICS | Inventive Grade, (unmicronized) | Competitive Grade, (micronized) |
| Bulk Density: Untapped, g/cc | 0.91 | 0.90 |
| Bulk Density: Tapped, g/cc | 1.29 | 1.32 |
| Brightness, Plastic | 99.70 | 99.85 |
| Masstone, Plastic | 0.12 | 0.15 |
| Tint Strength, Plastic | 99.5 | 101 |
| Tint Tone, Plastic | −5.8 | −5.65 |
| % Volatile loss up to 300° C. | 0.20 | 0.213 |
| Rutile, % | 98.5 | 99.9 |

TABLE 1-continued

Typical Performance of Inventive Titanium Dioxide Pigment Compositions

| | TYPICAL VALUES | |
|---|---|---|
| CHARACTERISTICS | Inventive Grade, (unmicronized) | Competitive Grade, (micronized) |
| Total Titanium dioxide, % | 98.0 | 97.8 |
| Total Al2O3, % | 1.25 | 1.29 |
| SiO2, % | 0.05 | 0.19 |
| Organics, % | 0.50 | 0.50 |
| Calgon, % | 0.15 | — |
| Hydrophobicity | Hydrophobic | Hydrophobic |

The titanium dioxide pigment of the present teachings was processed in a Thermo Prism 16 mm twin screw extruder. The processing data is summarized in Table 2:

TABLE 2

Comparative Processing Data in a Compounding Lab Model Using 2MI LDPE (Thermo Prism 16 mm Twin Screw Extruder)

| Properties | 60% MB | 70% MB | 80% MB |
|---|---|---|---|
| Melt Flow Index, MFI | 1.81 | 1.11 | 0.23 |
| Pressure, bar | 25 | 19 | 29 |
| Torque, % | 45 | 44 | 65 |

QUV exposure data is summarized in Tables 3 to 5.

TABLE 3

Comparison of ΔE after 900 Hours Exposure in QUV

| with anti-oxidant | ΔL | Δa | Δb | ΔE |
|---|---|---|---|---|
| Inventive Grade | −0.24 | −0.04 | 0.52 | 0.57 |
| Competitive Grade 1 | −0.17 | −0.06 | 0.63 | 0.66 |
| Competitive Grade 2 | −0.25 | 0.03 | 0.45 | 0.52 |
| Competitive Grade 3 | −0.31 | −0.06 | 0.58 | 0.66 |
| Competitive Grade 4 | −0.20 | −0.01 | 0.68 | 0.71 |

TABLE 4

Comparison of ΔE after 900 Hours Exposure in QUV

| without anti-oxidant | ΔL | Δa | Δb | ΔE |
|---|---|---|---|---|
| Inventive Grade | 0.03 | 0 | 0.46 | 0.46 |
| Competitive Grade 1 | 0.10 | −0.07 | 0.46 | 0.61 |
| Competitive Grade 2 | 0.12 | 0.08 | 0.33 | 0.36 |
| Competitive Grade 3 | −0.07 | 0.04 | 0.37 | 0.38 |
| Competitive Grade 4 | 0.05 | −0.02 | 0.70 | 0.70 |

TABLE 5

Effect of Anti-Oxidant on "b" values after 2000 Hrs Exposure in QUV (Anti-oxidant: Irganox B-215, 0.30%)

| Sample ID | with anti-oxidant Δb | w/o-anti-oxidant Δb |
|---|---|---|
| Inventive Grade | 0.69 | 0.70 |
| Competitive Grade A | 0.60 | 0.66 |
| Competitive Grade B | 0.74 | 0.95 |

TABLE 5-continued

Effect of Anti-Oxidant on "b" values after
2000 Hrs Exposure in QUV
(Anti-oxidant: Irganox B-215, 0.30%)

| Sample ID | with anti-oxidant Δb | w/o-anti-oxidant Δb |
|---|---|---|
| Competitive Grade C | 0.72 | 1.14 |
| Competitive Grade D | 0.73 | 0.80 |

The inventive sample was tested to measure its durability based on UV reactivity of TiO2 pigment in a test based on TiO2 catalyzed reduction of lead carbonate to the metal. From Table 6, it can be seen that the inventive sample exhibited improved UV durability as measured by the above test relative to the comparative examples A, B and C.

TABLE 6

Evaluation of Catalytic Activity
UV-B Exposure Durability Test: 5 Hours Exposure
(Lead Carbonate Basis)

| Sample ID | Durability Grading* (1-10 arbitrary scale) |
|---|---|
| Inventive Grade | 6.1 |
| Competitive Grade A | 4.8 |
| Competitive Grade B | 2.9 |
| Competitive Grade C | 3.4 |

*High value indicates high durability

These values are indicative of a titanium dioxide pigment composition having good optical, durability, and processing properties.

Other embodiments of the present invention will be apparent to those skilled in the art from consideration of the present specification and practice of the present teachings disclosed herein. It is intended that the present specification and examples be considered as exemplary only.

What is claimed is:

1. A process of making titanium dioxide particles, comprising:
   forming a slurry comprising particles and a phosphate-containing agent, the particles comprising titanium dioxide and alumina;
   milling the slurry to form a homogeneous dispersion comprising milled particles;
   leaching the alumina off of the milled particles to form leached particles in a leached dispersion;
   treating the leached dispersion under conditions to react the leached alumina with the phosphate-containing agent to form aluminum phosphate and to coat the leached particles with the aluminum phosphate and form a slurry of coated particles.

2. The process of claim 1, wherein the treating comprises precipitating the aluminum phosphate from the leached dispersion onto the leached particles to form a uniform coating of aluminum phosphate on the leached particles.

3. The process of claim 1, further comprising:
   adding a surfactant to the slurry of coated particles, and forming a coating of surfactant on the coated particles.

4. A process of making titanium dioxide composite particles, comprising the steps of:

a) forming a slurry comprising titanium dioxide particles having a surface, and a dispersion promoter, wherein alumina is disposed upon the surface of the titanium dioxide particles;

b) milling the slurry to form a homogenous dispersion of titanium dioxide particles;

c) leaching the slurry to remove alumina from the surfaces of the titanium dioxide particles;

d) reacting the alumina with the dispersion promoter to form aluminum phosphate;

e) precipitating the aluminum phosphate from the slurry, onto the titanium dioxide particles, thereby coating the titanium dioxide particles with a uniform layer of aluminum phosphate to form aluminum phosphate-coated particles and a precipitated slurry.

5. The process of claim 4, further comprising:

f) adding a surfactant to the precipitated slurry and forming a layer of surfactant on the aluminum phosphate-coated particles.

6. The process of claim 5, wherein step (f) comprises adding an amount of surfactant sufficient to coat the aluminum phosphate-coated titanium dioxide particles such that the surfactant comprises from about 0.25% by weight to about 0.6% by weight, based on the weight of the aluminum phosphate-coated titanium dioxide particles.

7. The process of claim 4, wherein the surfactant of step (f) comprises an alpha-olefin/maleic acid co-oligomer.

8. The process of claim 7, wherein the alpha-olefin/maleic acid co-oligomer has the following formula:

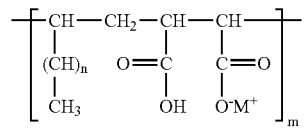

wherein:
n=6 to 9
m=40-45
M=a metallic monovalent cation.

9. The process of claim 4, further comprising:

g) recovering the aluminum phosphate-coated particles from the precipitated slurry.

10. The process of claim 9, wherein step g comprises filtering, washing, and drying the aluminum phosphate-coated particles.

11. The process of claim 4, wherein the titanium dioxide particles used to form the slurry of step (a) exhibit a carbon black undertone of from about −6 to about −8, and the alumina in the slurry of step (a) is present in a range of from about 1.20% by weight to about 1.30% by weight, based on the weight of the titanium dioxide portion of the particles.

12. The process of claim 4, wherein the slurry of step (a) comprises at least one liter of water and from about 400 to about 600 grams of titanium dioxide particles per liter of water.

13. The process of claim 4, wherein the leaching of step (c) comprises leaching the slurry under agitation, at a pH range and at a temperature sufficient to dissolve the alumina from the surface of the titanium dioxide particles.

14. The process of claim 4, wherein the leaching of step (c) comprises adjusting the pH of the slurry to from about 9.5 to about 11.5.

15. The process of claim 4, wherein the leaching of step (c) comprises adjusting the temperature of the slurry to from about from 70° C. to about 80° C.

16. Titanium dioxide composite particles having a surface coated with uniform layers of aluminum-phosphate and surfactant, wherein the composite particles contain less than 0.15% by weight SiO2 and the surfactant coating comprises an alpha-olefin/maleic acid co-oligomer.

17. The coated particles of claim 16, wherein the alpha-olefin/maleic acid co-oligomer coating comprises a co-oligomer having the following formula:

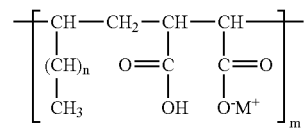

wherein:
n=6 to 9
m=40-45
M=a metallic monovalent cation.

* * * * *